United States Patent [19]
Molatalab

[11] 3,820,839
[45] June 28, 1974

[54] AUTOMOBILE CONVERTIBLE EITHER TO SEDAN OR STATION WAGON

[75] Inventor: Hossien Molatalab, Toronto, Ontario, Canada

[73] Assignee: The Raymond Lee Organization, Inc., New York, N.Y. ; a part interest

[22] Filed: Aug. 6, 1973

[21] Appl. No.: 386,044

[52] U.S. Cl................. 296/99, 296/26, 296/137 B
[51] Int. Cl............................................. B60j 7/04
[58] Field of Search ... 296/26, 99, 107, 108, 137 R, 296/137 B

[56] References Cited
UNITED STATES PATENTS
3,198,571  8/1965  Majeski................................ 296/26
3,378,298  4/1968  Wingen................................ 296/99

*Primary Examiner*—Robert B. Reeves
*Assistant Examiner*—Larry H. Martin

[57] ABSTRACT

An automobile has a rear trunk assembly employing parallel vertical side walls and a rear wall hinged to a bottom deck whereby the rear wall can be swung to horizontally rearward position. A rear window and trunk hood section is releasable from rear and side walls. The section is pivotally secured to roller means which engage and are slidable along guide rails disposed along the side walls. In one position the section defines rear window and hood of a conventional sedan; in another position the hood forms a rear roof extension and the window is aligned with the rear wall to define a station wagon. Retractable side windows are carried by the side walls for cooperating with the roof extension in the sedan configuration.

4 Claims, 6 Drawing Figures

PATENTED JUN 28 1974 3,820,839

AUTOMOBILE CONVERTIBLE EITHER TO SEDAN OR STATION WAGON

SUMMARY OF THE INVENTION

My invention is directed toward an automobile which can be easily and quickly converted from a sedan to a station wagon and vice versa. The automobile has a rear trunk assembly which is used in the conversion.

To this end, the assembly has a bottom deck with vertical parallel side walls and a rear wall. The rear wall can be hinged to the bottom deck whereby the rear wall can either assume the conventional wall position or can be swung to horizontally rearward position (for use in the wagon configuration).

A rear window and trunk hood section is releasable from the assembly whereby in the sedan configuration, the window and hood function conventionally. However, in the wagon configuration, the relative positions of these parts are reversed, with the hood forming a rear roof extension and the window being aligned with the rear wall.

Roller means pivotally secured to the section and slidably engaging guide rails disposed along the rear walls are employed to enable the section to be manipulated as shown.

Retractable windows carried by the side walls can be raised to cooperate with the rear roof extension in the station wagon configuration.

DETAILED DESCRIPTION OF PREFERRED EMBODIMENTS

Figure 1:
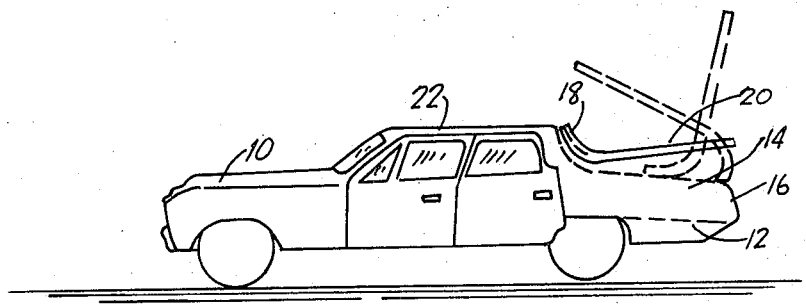
FIG. 1 shows my invention in sedan configuration.
Figure 2:
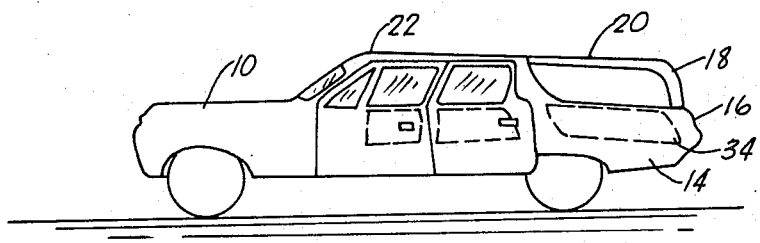
FIG. 2 shows my invention in station wagon configuration.
Figure 3:
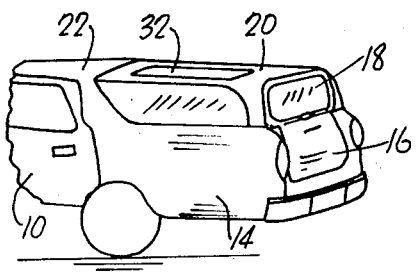
FIGS. 3 and 4 are detail views showing different positions of certain parts in the station wagon configuration.
Figure 4:
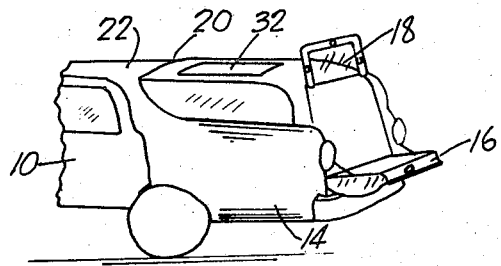
Figure 5:
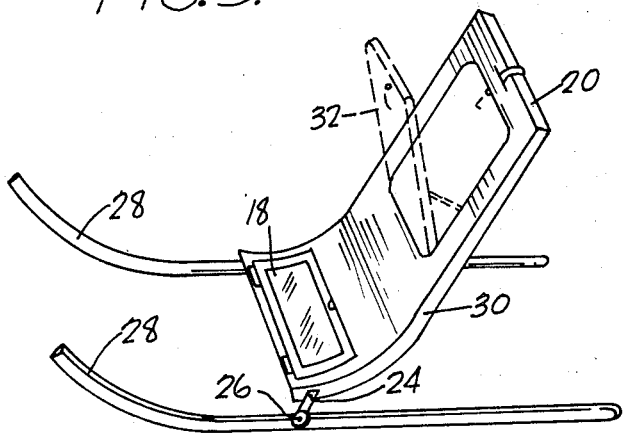
FIG. 5 is a detail view of the guide rails and window and hood section.
Figure 6:
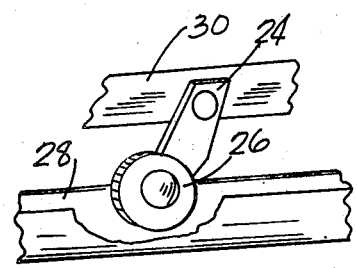
FIG. 6 is a detail view of a portion of the structure shown in FIG. 5.

Referring now to FIGS. 1-6, an automobile 10 has a rear trunk assembly having a bottom horizontal deck 12, parallel vertical side walls 14 and a rear wall 16. Rear wall 16 can be hinged to the deck whereby it swung downward and rearward to a horizontal position.

A rear window 18 and trunk hood 20 form a common section 30 which can be released from or locked to side and rear walls as well as the roof 22 of the vehicle by manually operated locks (not shown). The section is pivotally secured by linkages 24 to rollers 26 engaging and slidably disposed in guide rails 28 disposed along the side walls.

Thus the section can be swung either to a first position (shown in FIG. 1) at which the rear window and hood take conventional positions for use in a sedan or a second position (shown in FIG. 2) at which the hood becomes a rear extension of the roof and the rear window is aligned with the rear wall to define the station wagon configuration.

Retractable windows 34 carried by the side walls can be raised to cooperate with the roof extension in the station wagon configuration.

Window 18 can be slidable in the common section to permit opening and closing in the wagon configuration. Similarly hood 20 can have a removable panel 32, serving in this configuration as a sun roof.

While I have described my invention with particular reference to the drawings, such is not to be considered as limiting its actual scope.

Having thus described this invention, what is asserted as new is: I claim:

1. An automobile which can be readily and easily converted from a sedan to a station wagon and vice versa, said automobile having a rear trunk assembly, said assembly comprising:
   - a bottom deck having parallel vertical side walls and a rear wall;
   - guide rails disposed along the side walls;
   - a rear window and trunk hood section releasable from the rear and side walls;
   - roller means slidable along and engaged with said rails; and
   - means pivotally securing said section to said roller means whereby the section can be swung into a first position at which the rear window and hood assume conventional positions for a sedan and into a second position at which the hood forms a rear extension for the sedan roof and the rear window is aligned with the rear wall to assume conventional positions for a station wagon.

2. The automobile of claim 1 wherein said side walls carry retractable side windows which are raised to cooperate with the rear roof extension in the sedan configuration.

3. The automobile of claim 2 wherein the rear wall is hinged to the deck whereby this wall can be pivoted between essentially vertical position and a horizontally rearward position.

4. The automobile of claim 3 wherein said rear window is slidable in the section when in the station wagon configuration to permit opening and closing.

* * * * *